US009835044B2

(12) United States Patent
Lecordix

(10) Patent No.: US 9,835,044 B2
(45) Date of Patent: Dec. 5, 2017

(54) TURBOMACHINE COMPRISING A PLURALITY OF FIXED RADIAL BLADES MOUNTED UPSTREAM OF THE FAN

(71) Applicant: SNECMA, Paris (FR)

(72) Inventor: Jean-Loic Herve Lecordix, Blandy les Tours (FR)

(73) Assignee: SNECMA, Paris (FR)

( * ) Notice: Subject to any disclaimer, the term of this patent is extended or adjusted under 35 U.S.C. 154(b) by 330 days.

(21) Appl. No.: 14/418,670

(22) PCT Filed: Jul. 29, 2013

(86) PCT No.: PCT/FR2013/051818
§ 371 (c)(1),
(2) Date: Jan. 30, 2015

(87) PCT Pub. No.: WO2014/023891
PCT Pub. Date: Feb. 13, 2014

(65) Prior Publication Data
US 2015/0300198 A1      Oct. 22, 2015

(30) Foreign Application Priority Data

Aug. 9, 2012   (FR) ..................................... 12 57742

(51) Int. Cl.
*F01B 25/00*       (2006.01)
*F01D 17/16*       (2006.01)
*F04D 29/56*       (2006.01)

(52) U.S. Cl.
CPC ......... *F01D 17/162* (2013.01); *F04D 29/563* (2013.01); *F05D 2220/36* (2013.01); *Y02T 50/671* (2013.01)

(58) Field of Classification Search
CPC .. F01D 17/162; F04D 29/563; F05D 2220/36; Y02T 50/671

(Continued)

(56) References Cited

U.S. PATENT DOCUMENTS 3,248,877 A  *  5/1966  Alderson ............ B64C 29/0016
                                                244/12.5
3,299,638 A  *  1/1967  Santamaria ......... B64C 29/0025
                                                239/265.19
(Continued)

FOREIGN PATENT DOCUMENTS

DE        767 258 C      5/1952
FR      2 360 758 A1     3/1978
(Continued)

OTHER PUBLICATIONS

International Search Report dated Nov. 22, 2013 in PCT/FR2013/051818 filed Jul. 29, 2013.

(Continued)

*Primary Examiner* — Jessica Cahill
(74) *Attorney, Agent, or Firm* — Oblon, McClelland, Maier & Neustadt, L.L.P.

(57) ABSTRACT

A bypass turbine engine including an inner casing, an inter-duct casing and an outer casing, wherein a primary duct is defined between the inter-duct casing and the inner casing, wherein a secondary duct is defined between the inter-duct casing and the outer casing wherein a rotary shaft includes, at the upstream end, a movable fan including radial blades of which the free ends face the outer casing of the turbine engine so as to compress an air flow at least in the secondary duct, wherein a plurality of variable-pitch radial stator vanes are mounted upstream of the movable fan, the variable-pitch vanes being configured to deflect the incident axial air, wherein the movable fan is configured to axially rectify the air deflected in the secondary duct, and the turbine engine not being provided with stator vanes in the secondary duct downstream of the movable fan.

14 Claims, 4 Drawing Sheets

(58) Field of Classification Search
 USPC .......................................................... 415/144
 See application file for complete search history.

(56) References Cited

U.S. PATENT DOCUMENTS

| | | | |
|---|---|---|---|
| 4,072,008 A | 2/1978 | Kenworth et al. | |
| 4,080,785 A | 3/1978 | Koff et al. | |
| 4,175,384 A * | 11/1979 | Wagenknecht | F02K 3/075 60/226.3 |
| 4,222,234 A | 9/1980 | Adamson | |
| 4,254,619 A * | 3/1981 | Giffin, III | F02K 3/075 244/55 |
| 4,292,802 A * | 10/1981 | Snow | F02K 3/075 60/204 |
| 4,474,345 A * | 10/1984 | Musgrove | B64C 29/0066 244/12.5 |
| 4,667,900 A * | 5/1987 | Kim | B64D 27/20 137/15.1 |
| 5,314,301 A * | 5/1994 | Knight | F01D 5/148 415/160 |
| 5,315,821 A * | 5/1994 | Dunbar | F02K 1/70 244/110 B |
| 5,680,754 A * | 10/1997 | Giffin | F02K 3/02 60/226.1 |

FOREIGN PATENT DOCUMENTS

| | | |
|---|---|---|
| FR | 2 398 890 A1 | 2/1979 |
| FR | 2 424 999 A1 | 11/1979 |
| FR | 2 688 827 A1 | 9/1993 |

OTHER PUBLICATIONS

"Kusnezow NK-93", Wikipedia, XP055061226, Jul. 24, 2012, 3 Pages http://de.wikipedia.org/w/index.php?title=Kusnezow_NK-93&oldid=105952941.

* cited by examiner

TURBOMACHINE COMPRISING A PLURALITY OF FIXED RADIAL BLADES MOUNTED UPSTREAM OF THE FAN

GENERAL TECHNICAL FIELD AND PRIOR ART

The present invention relates to the field of bypass turbine engines, in particular for an aircraft, in which air flows circulate from upstream to downstream.

FR2902142 by SNECMA discloses such a turbine engine. Conventionally, with reference to FIG. 1, the turbine engine 1 extends axially along an axis X-X and comprises an inner casing 11, an inter-duct casing 12 and an outer casing 13 so as to define a primary duct V1 between the inter-duct casing 12 and the inner casing 11, and a secondary duct V2 between the inter-duct casing 12 and the outer casing 13. In other words, the secondary duct V2 and the primary duct V1 are annular and are separated by the inter-duct casing 12.

The turbine engine 1 comprises a rotary shaft comprising, at the upstream end, a movable fan 2 for compressing an incident air flow F, the movable fan 2 comprising radial blades 20 of which the free ends face the outer casing 13 of the turbine engine 1 so as to compress an air flow at least in the secondary duct V2 and, preferably, also in the primary duct V1. Conventionally, the turbine engine 1 is referred to as a ducted-fan turbine engine.

The air flow circulating in the primary duct V1 is conventionally compressed by compressor stages of the turbine engine 1 before entering the combustion chamber. The combustion energy is recovered by turbine stages which are involved in driving the compressor stages and the upstream movable fan 2. The air flow circulating in the secondary duct V2 for its part is involved in providing the thrust of the turbine engine 1.

Conventionally, the secondary duct V2 comprises, downstream of the movable fan 2, fixed radial vanes or stator vanes 3, known to a person skilled in the art as outlet guide vanes (OGV), for rectifying the air flow $F_0$ deflected by the movable fan 2 during its rotation. In a similar manner, the primary duct V1 comprises, downstream of the movable fan 2, fixed radial vanes or stator vanes 4, known to a person skilled in the art as inlet guide vanes (IGV). "Fixed vane" or "stator vane" means a vane which is not driven in rotation about the axis X-X of the turbine engine 1, that is to say by contrast with a movable blade or rotor blade of a rotor stage of the turbine engine 1.

The invention more particularly relates to turbine engines having a high bypass ratio, that is to say a ratio of deflection of air in the secondary duct V2 that is high compared with the air flow deflected in the primary duct V1. The bypass ratio (BPR) is known to a person skilled in the art and depends on the configuration of the casings 11, 12, 13 of the turbine engine (diameter, radial spacing, etc.). In the following, a "high" bypass ratio means a bypass ratio of greater than 15. In other words, for such a turbine engine 1, the flow rate of air in the secondary duct V2 is 15 times greater than the flow rate of air in the primary duct V1.

A turbine engine 1 having a high bypass ratio advantageously allows a high level of thrust to be obtained with reduced fuel consumption.

Nevertheless, the more the dimensions of the secondary duct V2 are increased, the more the diameter of the outer casing 13 is increased, which presents major drawbacks in terms of mass and drag. Another drawback of turbine engines having a high bypass ratio is that it is necessary to increase the dimensions and the mass of the thrust reversers.

In addition, a main object of the invention is to propose a turbine engine which has reduced consumption and of which the mass is also reduced.

Moreover, the greater the diameter of the outer casing 13, the greater the length of the blades 20 of the movable fan 2. In practice, for a rotational speed of the blades 20 of approximately 400 m/s, the air flow deflected by the ends of the blades 20 may reach supersonic speeds of approximately Mach 1.3, which presents drawbacks in terms of acoustics. In addition, a high speed of the air flow $F_0$ deflected by the movable fan 2 generates shockwaves in the turbine engine 1, causing a reduction of the compression efficiency. After the air flow is deflected by the movable fan 2, the air flow $F_0$ deflected in the secondary duct V2 has an axial and tangential component and needs to be rectified axially by the fixed radial vanes 3 of the OGV type. The tangential component added to the axial component of the air flow $F_0$ deflected in the secondary duct V2 by a vane 20 having a large diameter may be a source of noise in a turbine engine 1.

A further object of the invention is to propose a turbine engine having limited acoustic impact.

GENERAL DESCRIPTION OF THE INVENTION

In order to overcome some of these drawbacks, the invention relates to a bypass turbine engine, in particular for an aircraft, in which air flows circulate from upstream to downstream, the turbine engine extending axially and comprising an inner casing, an inter-duct casing and an outer casing so as to define a primary duct between the inter-duct casing and the inner casing, and a secondary duct between the inter-duct casing and the outer casing, a rotary shaft comprising, at the upstream end, a movable fan comprising radial blades of which the free ends face the outer casing of the turbine engine so as to compress an air flow at least in the secondary duct, the turbine engine comprising a plurality of variable-pitch radial stator vanes mounted upstream of the movable fan, the variable-pitch radial vanes being configured to deflect the incident axial air and the movable fan being configured to axially rectify said air deflected in the secondary duct, the turbine engine not being provided with stator vanes in the secondary duct downstream of the movable fan.

The presence of radial stator vanes upstream of the movable fan advantageously allows the axial incident air flow to be deflected prior to being rectified by the movable fan, so that the direction of the air flow downstream of the movable fan is solely axial. In addition, it is no longer necessary to resort to fixed guide vanes or stator vanes downstream of the fan, and this makes the turbine engine lighter.

Owing to the variable pitch of the radial stator vanes, the incident air flow is adapted to the requirements of the turbine engine, that is to say to its operating state. In addition, in a given pitch position, the radial stator vanes allow an air-brake function to be provided. The turbine engine thus does not need a thrust reverser connected to the turbine engine, and this reduces its mass and complexity.

Preferably, the variable-pitch radial vanes have an aerodynamic profile so as to accelerate the incident air flow when it is being deflected by the variable-pitch radial vanes. In other words, the variable-pitch radial vanes allow a laminar flow of the air flow. Preferably, the aerodynamic profile of the vanes allows an acceleration of the air flow over at least 75% of the chord.

Preferably, the inner casing, the inter-duct casing and the outer casing are at a radial distance from one another in the turbine engine so as to define a turbine engine having a bypass ratio that is greater than or equal to 15. Preferably, the rotational speed of the free ends of the blades of the movable fan is less than 340 m/s. For turbine engines having a high bypass ratio, they may benefit from a high level of thrust for a movable fan driven at a slow speed, that is to say less than 340 m/s. Advantageously, high speeds are prevented from occurring when air is being deflected by the blades of the fan. Owing to the invention, the noise of turbine engines having a high bypass ratio is limited by taking advantage of the slow speed of the movable fan.

According to a preferred aspect of the invention, the plurality of variable-pitch radial vanes extend in the same plane which is transverse to the axis of the turbine engine in order to allow homogenous deflection of the incident air flow prior to it being rectified by the movable fan.

Preferably, the axial distance between the plurality of variable-pitch radial vanes and the movable fan is between 0.1 and 10 times the mean chord of a variable-pitch radial vane so as to optimise the rectification while limiting the length of the turbine engine and its nacelle.

According to the invention, the turbine engine does not comprise stator vanes mounted in the secondary duct downstream of the movable fan. The air flow deflected by the movable fan is axially rectified and does not require the presence of downstream radial vanes, and this reduces the mass and complexity of the turbine engine. In a similar manner, according to a preferred aspect of the invention, the turbine engine does not comprise stator vanes mounted in the primary duct downstream of the movable fan.

According to an aspect of the invention, the blades of the movable fan extend only between the inner casing and the outer casing of the turbine engine.

According to another aspect of the invention, the blades of the movable fan extend between the inter-duct casing and the outer casing of the turbine engine.

Preferably, the variable-pitch radial vanes are adapted, in a given pitch position, to block the circulation of air in the secondary duct and to permit the circulation of air in the primary duct.

Preferably, the turbine engine comprises means for individually adjusting the pitch of the variable-pitch radial vanes to allow an adaptive pitch to be provided depending on the configuration of the turbine engine, for example if there is a strut downstream of the movable fan. The adjustment means advantageously allow the pitch of certain variable-pitch radial vanes to be locally modified to allow, for example, a greater amount of air to circulate and to thus compensate the presence of an element blocking the circulation of air downstream of the movable fan.

Still preferably, the turbine engine comprises means for individually regulating the pitch of the variable-pitch radial vanes if heterogeneity of the air flow in the secondary duct is detected. Therefore, if a crosswind or boundary layer ingestion is detected, the air flow in the secondary duct is re-homogenised and adapted to the incidence of the movable blades by providing an individual pitch for each variable-pitch radial vane in order to limit the risk of a surge in the turbine engine.

Still preferably, each variable-pitch radial vane has an aerodynamic profile so as to accelerate the incident air flow in accordance with a laminar flow.

Preferably, each variable-pitch radial vane has a body which is movable in rotation about a radial axis so as to maintain an identical profile for each operating state of the turbine engine. An integral radial vane of this type is simple to manufacture.

According to another aspect of the invention, each variable-pitch radial vane has a fixed body and a movable flap, only the flap being moved depending on the operating state of the turbine engine. A radial vane of this type comprising a flap makes it possible to keep a leading edge oriented in an identical manner for each operating state, only the trailing edge being movable for precisely orienting the air flow on the movable fan.

Preferably, the cross-sectional area of the movable flap increases over its length from its tip towards its root so as to allow the circulation of an air flow in the secondary duct to be blocked while allowing an air flow to circulate in the primary duct. Therefore, the variable-pitch radial vanes allow an air-brake function to be provided, while allowing air to be fed to the turbine engine.

DESCRIPTION OF THE DRAWINGS

The invention will be better understood upon reading the following description, which is given purely by way of example, and with reference to the accompanying drawings, in which.

It should be noted that the drawings disclose the invention in a detailed manner in order to carry out the invention, and said drawings can of course serve to give a better definition of the invention where appropriate.

DESCRIPTION OF ONE OR MORE EMBODIMENTS

Figure 1:
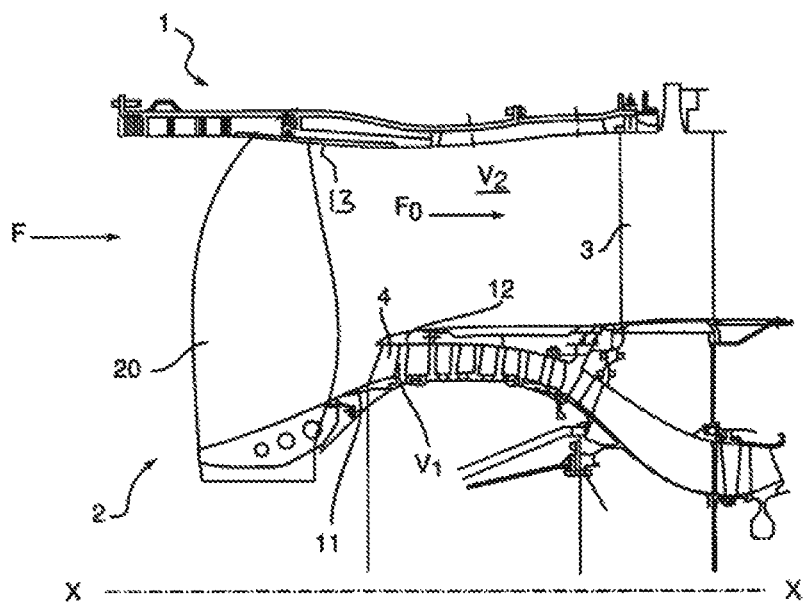
FIG. 1 is a section through a bypass turbine engine according to the prior art.
Figure 2:
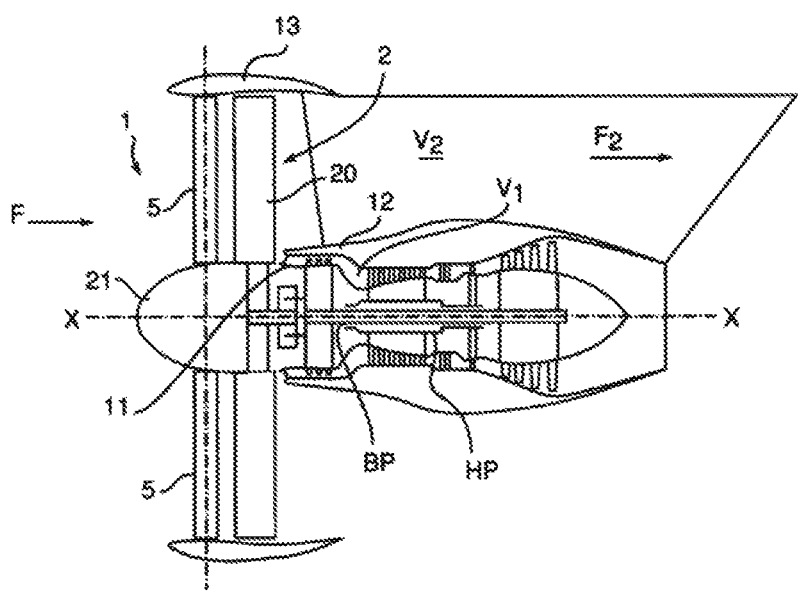
FIG. 2 is a section through a bypass turbine engine according to the invention.

With reference to FIG. 2, which is a schematic view of a turbine engine according to the invention for an aircraft, the turbine engine 1 extends axially along an axis X-X and comprises an inner casing 11, an inter-duct casing 12 and an outer casing 13 so as to define a primary duct V1 between the inter-duct casing 12 and the inner casing 11, and a secondary duct V2 between the inter-duct casing 12 and the outer casing 13. In other words, the secondary duct V2 and the primary duct V1 are annular and are separated by the inter-duct casing 12.

In this example, the turbine engine 1 comprises a low-pressure rotary shaft BP and a high-pressure rotary shaft HP, the low-pressure rotary shaft BP comprising, at the upstream end, a movable fan 2 comprising radial blades 20 of which the free ends face the outer casing 13 of the turbine engine so as to compress an incident air flow F at least in the secondary duct V2. In the example in FIG. 2, the movable fan 2 accelerates an air flow in the secondary duct V2 and in the primary duct V1.

The air flow circulating in the primary duct V1 is conventionally compressed by compressor stages before entering the combustion chamber. The combustion energy is recovered by turbine stages, which drive the compressor stages and the upstream movable fan 2 stage. The air flow circulating in the secondary duct V2 for its part is involved in providing the thrust of the turbine engine 1. In this example, the turbine engine 1 has a high bypass ratio, that is to say greater than 15. In order to provide the desired thrust with a turbine engine having a high bypass ratio, it is advantageously possible to reduce the rotational speed of the movable fan 2 to speeds of less than 340 m/s, for example of approximately 250 m/s to 300 m/s.

According to the invention, the turbine engine 1 comprises a plurality of fixed radial vanes or stator vanes 5 mounted upstream of the movable fan 2 so as to deflect the incident axial air F prior to it being axially rectified by the movable fan 2 in the secondary duct V2, as shown in FIG. 2. By way of example, the turbine engine comprises at least twenty circumferentially distributed radial stator vanes 5. With reference to FIG. 2, the radial stator vanes 5 extend in the same plane which is transverse to the axis of the turbine engine 1 between the inner casing 11 and the outer casing 13 of the turbine engine 1, so as to entirely deflect the incident axial flow F received by the turbine engine 1.

In this example, the turbine engine 1 comprises, upstream of the fan 2, a fixed axial cone 21 which is rigidly connected to the inner casing 11 and in which the plurality of radial stator vanes 5 are mounted. Preferably, the axial distance between the plurality of radial stator vanes 5 and the movable fan 2 is between 0.1 and 10 times the mean chord of a radial stator vane so as to optimise the rectification. Advantageously, this allows the distance between the radial stator vanes 5 and the movable fan 2 to be reduced in order to form a more compact turbine engine. In addition, owing to the compactness of the turbine engine 1, said engine may integrate a nacelle having reduced dimensions in place of the outer casing 13, that is to say the fan casing.

Figure 3A:
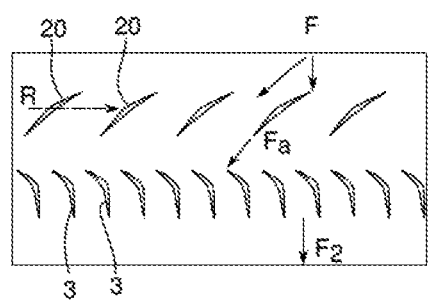
FIG. 3A is a schematic sectional view of the fan blades and of the fixed radial vanes or stator vanes for a turbine engine according to the prior art.

In the prior art, as shown in FIG. 3A, the incident axial air flow F received by the turbine engine 1 is first compressed by the blades 20 of the fan 2 in rotation in the direction R so that the deflected flow Fa has an axial and a tangential component. Then, the deflected flow Fa is axially rectified by radial stator vanes 3 of the OGV type, downstream of the movable fan 2, so that the air flow F2 circulating in the secondary duct V2 is oriented axially, as shown in FIG. 3A.

Figure 3B:
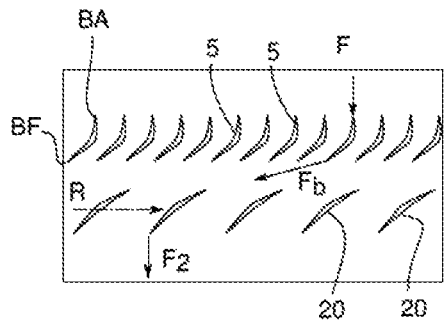
FIG. 3B is a schematic sectional view of the fan blades and of the fixed radial vanes or stator vanes for a turbine engine according to the invention.

According to the invention, the presence of radial stator vanes 5 upstream of the fan 2 allows the incident air flow F to be deflected prior to it being compressed by the movable fan 2. In fact, as shown in FIG. 3B, the plurality of radial stator vanes 5 mounted upstream of the movable fan 2 allow the incident air flow F to be deflected so that the deflected air flow Fb has an axial and a tangential component. Then, the deflected air flow Fb is axially rectified by the movable blades 20 and compressed so that the air flow F2 circulating in the secondary duct V2 is oriented axially, as shown in FIG. 3B. Advantageously, the air flow F2 output from the fan 2 predominantly only has an axial component.

In this example, each radial stator vane 5 has an elongate, preferably three-dimensional, shape, extending in a radial direction. Each radial stator vane 5 has a substantially constant chord over its length. Preferably, each radial stator vane 5 has an aerodynamic body having a leading edge BA and a trailing edge BF so as to, on one hand, deflect any incident air flow F received by the radial stator vane 5 and, on the other hand, accelerate the incident air flow in a continuous manner to maintain laminar flow. Preferably, the profile allows an acceleration of the incident air flow over at least 75% of the chord of the vane.

The radial stator vane 5 has a root mounted in the inter-duct casing 12 and a tip mounted in the outer casing 13 by connection means of the nut and bolt type, but other connection means may of course also be suitable.

According to the invention, the radial stator vanes 5 have a variable pitch so as to allow optimum deflection of the incident air flow F for each operating state of the turbine engine (take-off TO (FIG. 4), cruising C (FIG. 3B) or braking L (FIG. 5)). "Variable pitch" means the orientation of the stator vane 5 or a part of the stator vane 5 around a substantially radial axis.

Preferably, the pitch angle θ is defined by (passive or active) regulation depending on the operating state of the turbine engine 1. In this example, the pitch angle θ is determined by a computer on board the turbine engine and then communicated to an actuating device which modifies the pitch of the vane during operation of the turbine engine 1. By way of example, the actuating device comprises an actuator which moves a pitch wheel to which the radial stator vanes 5 are connected by a plurality of connecting rods. The actuating device could of course be in various different forms.

With reference to FIG. 3B, the pitch angle during cruising operation of the turbine engine 1 is determined depending on the rotational speed of the fan 20 during cruising, so that the downstream air flow F2 circulates axially in the secondary duct V2 to provide optimum thrust. In this example, the trailing edge BF of the radial stator vanes 5 is directed obliquely relative to a radial plane, as shown in FIG. 3B. In the following, the cruising pitch angle $\theta_C$ is used as a reference pitch angle and is shown by dotted lines in FIGS. 4 to 6.

Figure 4:
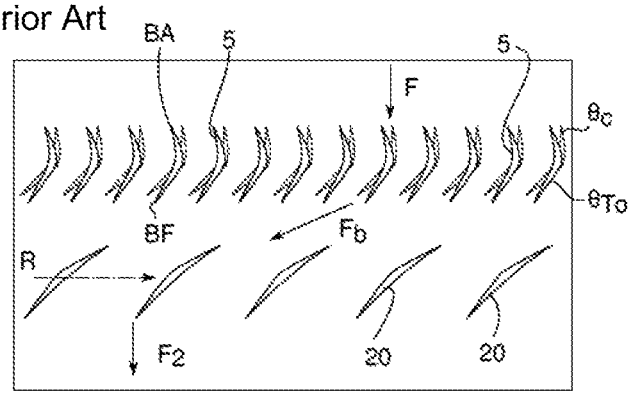
FIG. 4 is a schematic sectional view of the radial stator vanes during take-off.

With reference to FIG. 4, during take-off, the turbine engine 1 requires a large amount of air. For this purpose, the pitch angle $\theta_{TO}$ during take-off is adapted to promote axial circulation of the air flow Fb deflected by the radial stator vanes 5. In this example, the trailing edge BF of the radial stator vanes 5 is increased, that is to say brought closer to the axial position, in order to reduce the initial deflection, as shown in FIG. 4. Therefore, the incident air flow F is less deflected by the radial stator vanes 5, and this promotes a high flow rate of air for feeding the secondary duct V2.

Figure 5:
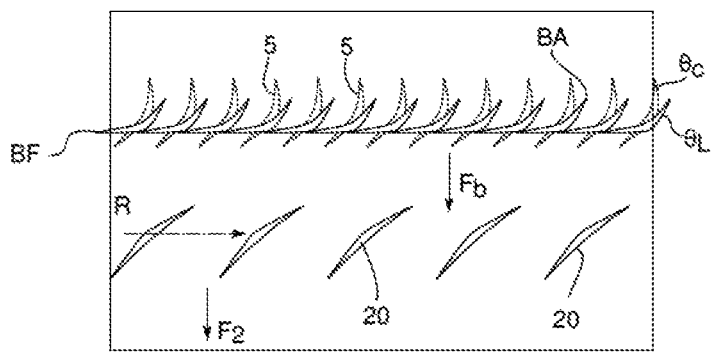
FIG. 5 is a schematic sectional view of the radial stator vanes during thrust inversion.

With reference to FIG. 5, when the aircraft brakes and in order to ensure thrust inversion, the turbine engine 1 requires a low amount of air. For this purpose, the pitch angle $\theta_L$ is adapted to limit the axial circulation of the air flow Fb deflected by the radial stator vanes 5. In this example, the trailing edge BF of the radial stator blades 5 is directly circumferentially, that is to say towards the plane which is transverse to the axis of the turbine engine as shown in FIG. 5, in order to limit (or stop) the amount of air provided to the movable fan 2. The radial stator vanes 5 having such a pitch angle $\theta_L$ further allow a planar transverse surface to be formed which comes up against the incident air flow F during braking. In other words, the radial stator vanes 5 form an air brake, which is very advantageous and avoids the use of auxiliary devices which are heavy and large (thrust inverter, etc.).

Preferably, when the stator vanes 5 are provided with a pitch for the braking of the aircraft, an incident air flow F can always circulate in the primary duct V1 in order to allow the turbine engine 1 to operate. Such a function is, for example, achieved by means of three-dimensional radial stator vanes 5 which cooperate for the pitch angle $\theta_L$ in order to form a plane for blocking the secondary duct V2, while allowing the air flow to circulate in the primary duct V1.

Preferably, each radial stator vane 5 has the same pitch angle θ for a given operating mode.

Figure 6:
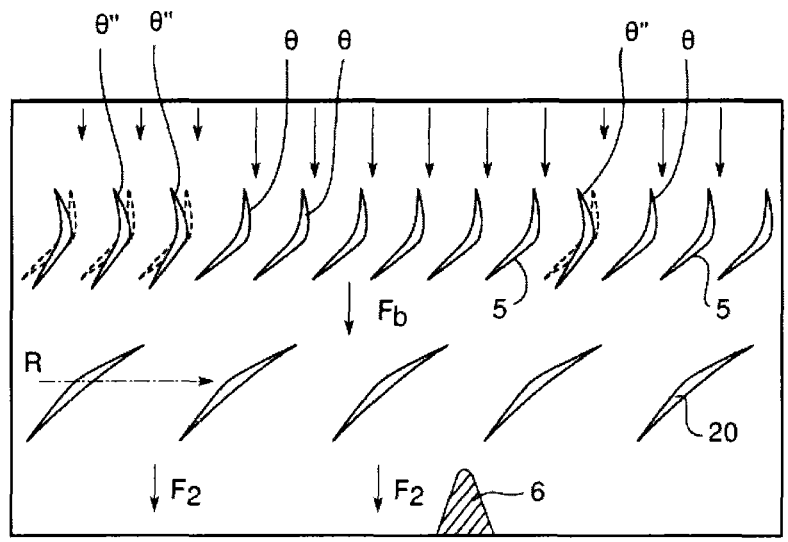
FIG. 6 is a schematic sectional view of the radial stator vanes when they are provided with an adaptive pitch.

According to an aspect of the invention, each radial stator vane 5 does not have the same pitch angle θ. With reference to FIG. 6, the pitch of the radial stator vanes 5 is produced adaptively so that the air flow F2 circulating in the secondary duct V2 extends axially so as to limit surge phenomena in the turbine engine. Preferably, the turbine engine 1 comprises means for individually regulating the pitch of the radial stator vanes 5 so as to allow an adaptive pitch to be provided depending on the configuration of the turbine engine 1, for example if there is a strut 6 downstream of the movable fan.

As shown in FIG. 6, when the turbine engine comprises elements which limit the circulation of air downstream of the fan 2, the pitch angle θ of the stator vanes 5, which are aligned substantially longitudinally with these elements, is adapted. In fact, since the stator vanes 5 produce tangential deflection of the incident air flow, the vanes affected by an adaptive pitch depend on the standard pitch angle θ.

By way of example, the radial stator vane 5 which is aligned substantially longitudinally with a strut 6 of the turbine engine 1 has a pitch angle θ' which is different from that of the pitch angles θ of the other radial stator vanes 5. In fact, the pitch angle θ' is reduced to allow a greater amount of air to circulate in the turbine engine 1 in order to compensate the disruption from the strut 6. In other words, despite the presence of the strut 6, the axial air flow F2 circulating in the secondary duct V2 is homogenous downstream of the fan.

Still preferably, the turbine engine 1 comprises means for regulating the pitch of the radial stator vanes depending on whether heterogeneity of the air flow in the secondary duct V2 is detected. Therefore, if the pilot of an aircraft on which the turbine engine is mounted detects such heterogeneity, they may operate the regulating means to compensate this heterogeneity. For example, if the upstream flow is distorted (crosswind or boundary layer ingestion), the air flow in the secondary duct V2 downstream of the fan is homogenous owing to the adaptation. Such a circumferential adaptive pitch advantageously makes it possible to limit the risks of disengagement or of a surge in the turbine engine 1, and this improves the performance and the safety of said engine.

The pitch of the radial stator vanes 5 may be produced individually or in a grouped manner, for example a plurality of consecutive vanes having the same pitch. In other words, the stator vanes are provided with a pitch "block by block".

Figures 7A, 7B:
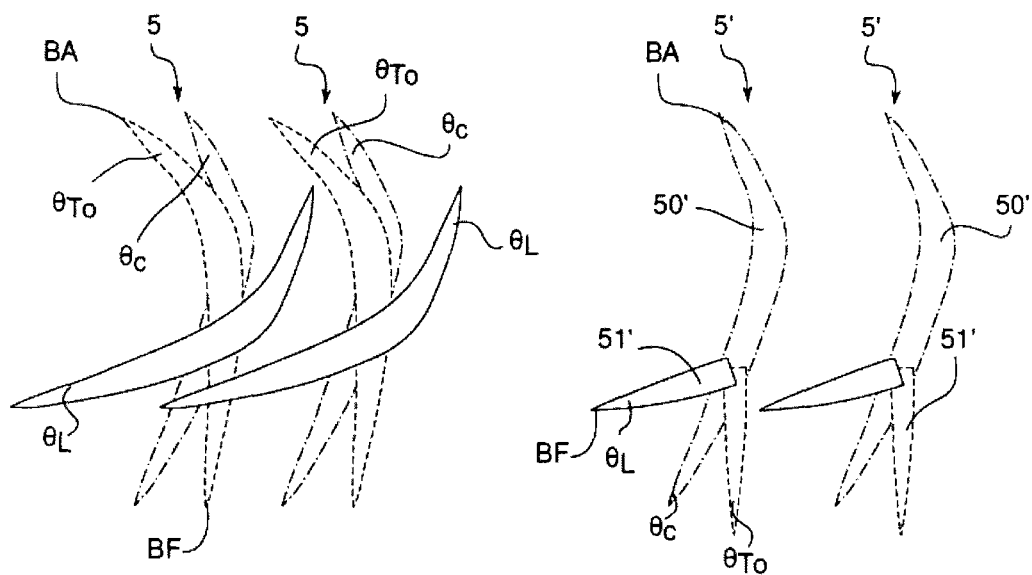
FIG. 7A is a schematic view of a plurality of pitch positions of an integral radial stator vane according to the invention having a movable body.
FIG. 7B is a schematic view of a plurality of pitch positions of an integral radial stator vane according to the invention having a fixed body and a movable flap.

Variable-pitch means for the radial stator vanes 5 of the turbine engine 1 have been set out above. According to a first embodiment, each radial stator vane 5 has an integral body which is movable in rotation about a radial axis (FIG. 7A). Therefore, depending on the operating state of the turbine engine 1, the entire radial stator vane 5 is oriented about its axis of extension in order to have a pitch in accordance with the cruising pitch angle $\theta_C$, the take-off pitch angle $\theta_{TO}$ or the pitch angle when slowing down $\theta_L$.

Figure 8:
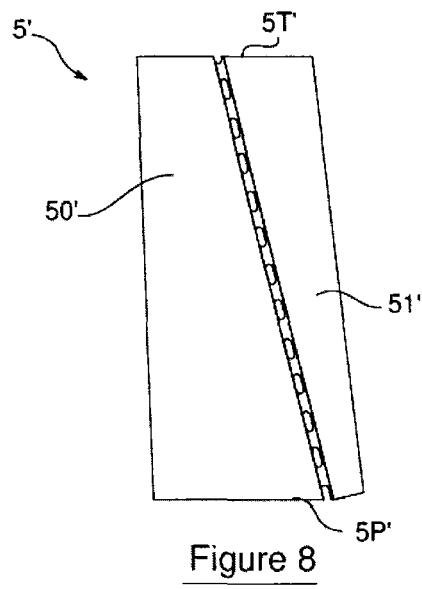
FIG. 8 is a schematic side view of a radial stator vane according to the invention having a fixed body and a movable flap.

According to a second embodiment, each radial stator vane 5' has a fixed body 50' and a movable flap 51', as shown in FIGS. 7B and 8. Preferably, the flap 51' includes the trailing edge BF of the radial vane 5' and is articulated about an axis on the body 50' of the vane 5' which remains fixed. In this example, the movable flap 51' has a cross section which increases over its length, as shown in FIG. 8. Preferably, the cross section increases from the root 5P' of the stator vane 5 to its tip 5T', as shown in FIG. 8, to allow secondary duct V2 to be blocked in the pitch position $\theta_L$ during landing, while allowing the primary duct V1 to be fed.

Figure 9:
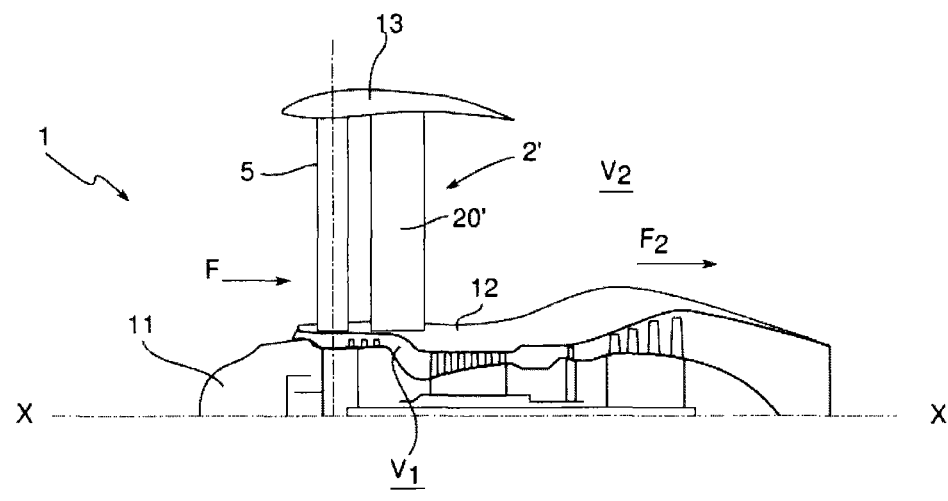
FIG. 9 is a cross section through another embodiment of a bypass turbine engine according to the invention.

According to another embodiment of the invention, with reference to FIG. 9, the movable fan 2' comprises movable blades 20' which extend radially between the inter-duct casing 12 and the outer casing 13 so as to compress an air flow exclusively in the secondary duct V2, the primary duct V1 not receiving an air flow compressed by the movable fan 2'. As a result, the radial stator vanes 5 are mounted between the inter-duct casing 12 and the outer casing 13 in order to deflect the incident air flow F prior to it being compressed by the movable fan 2'. The radial stator blades 5 may of course be integral or may comprise a movable flap in this configuration of the turbine engine 1.

The invention claimed is:

1. A bypass turbine engine, wherein air flows circulate from upstream to downstream, the turbine engine extending axially and comprising:
   an inner casing,
   an inter-duct casing, and
   an outer casing,
   wherein a primary duct is defined between the inter-duct casing and the inner casing,
   wherein a secondary duct is defined between the inter-duct casing and the outer casing,
   wherein a rotary shaft comprises, at an upstream end, a movable fan comprising radial blades of which the free ends face the outer casing of the turbine engine so as to compress an air flow at least in the secondary duct, said radial blades of the movable fan extending in a same transversal plane with respect to an axis of the turbine engine,
   wherein a plurality of variable-pitch radial stator vanes are mounted upstream of the movable fan, said variable-pitch radial stator vanes being configured to deflect incident axial air,
   wherein the movable fan is configured to axially rectify said air deflected in the secondary duct, and
   the turbine engine not being provided with stator vanes in contact with the outer casing downstream of the movable fan.

2. The turbine engine according to claim 1, wherein the inner casing, the inter-duct and the outer casing are at a radial distance from one another in the turbine engine so as to define a turbine engine having a bypass ratio (BPR) that is at least equal to 15.

3. The turbine engine according to claim 1, wherein a rotational speed of the free ends of the blades of the movable fan is less than 340 m/s.

4. The turbine engine according to claim 1, wherein the plurality of variable-pitch radial stator vanes extends in a same plane which is transverse to an axis of the turbine engine.

5. The turbine engine according to claim 1, wherein an axial distance between the plurality of variable-pitch radial stator vanes and the movable fan is between 0.1 and 10 times a mean chord of a variable-pitch radial stator vane.

6. The turbine engine according to claim 1, wherein the blades of the movable fan extend between the inner casing and the outer casing of the turbine engine.

7. The turbine engine according to claim 1, wherein each variable-pitch radial vane has an aerodynamic profile so as to accelerate a flow of the incident axial air in accordance with a laminar flow.

8. The turbine engine according to claim 1, wherein each variable-pitch radial stator vane has a body which is movable in rotation about a radial axis.

9. The turbine engine according to claim 1, wherein each variable-pitch radial vane has a fixed body and a movable flap.

10. The turbine engine according to claim 1, wherein the plurality of variable-pitch radial stator vanes forms a planar transverse surface with respect to the axis of the turbine engine at a given pitch position of each of the variable-pitch radial stator vanes.

11. The turbine engine according to claim 1, wherein the variable-pitch radial stator vanes are mounted on a fixed axial cone connected to the inner casing.

12. The turbine engine according to claim 1, wherein the variable-pitch radial stator vanes extend radially between the inter-duct casing and the outer casing.

13. A bypass turbine engine, wherein air flows circulate from upstream to downstream, the turbine engine extending axially and comprising:
   an inner casing,
   an inter-duct casing, and
   an outer casing,
   wherein a primary duct is defined between the inter-duct casing and the inner casing,
   wherein a secondary duct is defined between the inter-duct casing and the outer casing,
   wherein a rotary shaft comprises, at an upstream end, a movable fan comprising radial blades of which the free ends face the outer casing of the turbine engine so as to compress an air flow at least in the secondary duct,
   wherein a plurality of variable-pitch radial stator vanes are mounted upstream of the movable fan, said variable-pitch radial stator vanes being configured to deflect incident axial air,
   wherein the movable fan is configured to axially rectify said air deflected in the secondary duct, and
   the turbine engine not being provided with stator vanes in contact with the outer casing downstream of the movable fan and axially between radial blades of the movable fan.

14. A bypass turbine engine, wherein air flows circulate from upstream to downstream, the turbine engine extending axially and comprising:
   an inner casing,
   an inter-duct casing, and
   an outer casing,
   wherein a primary duct is defined between the inter-duct casing and the inner casing,
   wherein a secondary duct is defined between the inter-duct casing and the outer casing,
   wherein a rotary shaft comprises, at an upstream end, a movable fan comprising radial blades of which the free ends face the outer casing of the turbine engine so as to compress an air flow at least in the secondary duct,
   wherein a plurality of variable-pitch radial stator vanes are mounted upstream of the movable fan, said variable-pitch radial stator vanes being configured to deflect incident axial air,
   wherein the movable fan is configured to axially rectify said air deflected in the secondary duct,
   wherein the turbine engine is not provided with stator vanes in contact with the outer casing downstream of the movable fan, and
   wherein the inner casing, the inter-duct and the outer casing are at a radial distance from one another in the turbine engine so as to define a turbine engine having a bypass ratio (BPR) that is at least equal to 15.

* * * * *